(12) United States Patent
Kosar et al.

(10) Patent No.: US 6,406,011 B1
(45) Date of Patent: Jun. 18, 2002

(54) WIRE ROPE ISOLATOR WITH PINNED BAR AND METHOD FOR MAKING SAME

(75) Inventors: Kaya A. Kosar, Lancaster; Kenneth A. Dickerson, Bolivar; John K. Stafford, Franklinville, all of NY (US)

(73) Assignee: Enidine Incorporated, Orchard Park, NY (US)

( * ) Notice: Subject to any disclaimer, the term of this patent is extended or adjusted under 35 U.S.C. 154(b) by 0 days.

(21) Appl. No.: 09/496,517

(22) Filed: Feb. 2, 2000

(51) Int. Cl.[7] ................................................. F16F 3/00
(52) U.S. Cl. ....................................... 267/148; 248/570
(58) Field of Search ................................ 267/136, 148, 267/166; 248/570, 636, 638

(56) References Cited

U.S. PATENT DOCUMENTS

| | | |
|---|---|---|
| 3,596,865 A | 8/1971 | Camossi |
| 4,190,227 A | 2/1980 | Belfield et al. |
| 4,713,917 A * | 12/1987 | Buckle et al. ................. 52/167 |
| 4,783,038 A | 11/1988 | Gilbert et al. |
| 5,062,507 A * | 11/1991 | Roche .......................... 188/378 |
| 5,240,232 A | 8/1993 | Loziuk |
| 5,441,243 A | 8/1995 | Loziuk |
| 5,522,585 A * | 6/1996 | Loziuk ......................... 267/148 |
| 5,549,285 A * | 8/1996 | Collins ......................... 267/148 |
| 5,791,635 A * | 8/1998 | Loziuk ......................... 267/136 |
| 5,791,636 A | 8/1998 | Loziuk |
| 5,897,093 A * | 4/1999 | Le Derf ........................ 248/628 |
| 6,120,014 A * | 9/2000 | Lee et al. ..................... 267/169 |

* cited by examiner

Primary Examiner—Christopher P. Schwartz
(74) Attorney, Agent, or Firm—Wall, Marjama & Bilinski, LLP

(57) ABSTRACT

A wire rope vibration isolator employing a wire cable passed in a continuous loop through lateral hollow, cylindrical members, holes, channels or the like, formed therethrough in one or more mounting blocks or entrapment members. The mounting blocks manipulate the wire cable into a geometric shape, such as a coil or helix, that is capable of imparting elastic, spring-like qualities in the wire rope. The geometric shape of the wire rope is maintained and secured by driving dowel pins of sufficient length through the outer surface of the mounting block into the lateral hole contained therein to stake the wire rope into locking contact with the mounting block. The dowel pins are composed of material that has a harder consistency than the material composing the mounting block and wire rope. The ends of the dowel pins not engaging the wire rope are pressed flush to the top surface of the mounting block. Once assembled, the elastic quality of the wire rope allows to flex and contract when exposed to vibrational energy. This movement dissipates the unwanted vibrational energy. When attached to shock-sensitive equipment, the isolator insulates the equipment from the damaging vibrational energy.

5 Claims, 4 Drawing Sheets

WIRE ROPE ISOLATOR WITH PINNED BAR AND METHOD FOR MAKING SAME

BACKGROUND OF THE INVENTION

1. Field of the Invention

This invention relates in general to vibrational energy isolators, and in particular, wire rope isolators. More specifically, but without restriction to the particular embodiment hereinafter described in accordance with the best mode of practice, this invention relates to wire rope vibration isolators utilizing mounting blocks that employ dowel pins to mechanically engage wire ropes passed through lateral holes in the mounting blocks into locking contact with the blocks and the method of assembling such isolators.

2. Background of the Prior Art

Many operations require energy absorption devices to divert damaging vibrational energy away from shock-sensitive equipment and machinery. Shipboard electronics and navigational equipment, pumps, generators and compressors, chemical processing equipment, avionics, process piping and various other industries utilize energy dampers to prevent damage and premature wear to equipment vital to daily operations. The most basic energy absorption devices employ simple internal machinery, like pistons and springs, to harmlessly consume vibrational or kinetic energy thereby insulating shock-sensitive equipment secured to the device from potential damage caused by the unwanted vibrational energy. For example, the common automotive shock absorber, a member of the class of these devices, uses the shock force caused by driving on an uneven surface to move an internal piston which in turn decreases the total amount of energy of the system.

A common type of energy-absorbing restraint is the wire rope isolator. Most isolators of this class utilize a multi-strand wire rope that has been manipulated into a geometric shape. Particular geometric configurations impart the rope with elastic spring-like qualities which allow the wire rope to flex and contract when subject to dynamic displacement. The undulation of the rope consumes vibrational energy.

Most wire rope isolators currently utilized in industrial applications shape the wire rope into a coil or helix, although other configurations, such as saddles, are possible. The desired geometry of the wire rope is attained, in most instances, by threading the wire rope through hollow cylindrical members, channels and the like drilled into two or more entrapment members or mounting blocks. To maintain the wire cable in a helical formation, some devices secure the mounting blocks together with threaded fasteners. Examples of these types of isolators are illustrated in U.S. Pat. No. 3,596,865 issued to C. Camossi, U.S. Pat. No. 4,783,038 issued to C. L. Gilbert, et al., U.S. Pat. No. 5,062,507 issued to A. Roche. In addition, the isolator designs illustrated in the Loziuk patents, U.S. Pat. Nos. 5,441,243, 5,522,585 and 5,791,636, all of which suggest securing the two mounting blocks together with a threaded fastening means like a bolt which in turn maintains the helical formation of the wire rope. While this type of isolator has its advantages, there is a possibility that the threaded fasteners may become loose at some time.

The vibration isolator proposed by R. E. Belfield et al., U.S. Pat. No. 4,190,227 employs a method whereby the wire cable coil is molded in a retainer block which is formed from a thermoplastic material such as polyvinyl chloride or polystyrene. This proposal also has its disadvantages. It may fail under heavy loads or high temperatures. In addition, the bonded interface between the thermoplastic material and the wire cable may fail due to cyclic fatigue.

The wire rope isolator illustrated in U.S. Pat. No. 5,549,285 issued to Collins suggests that the wire rope configuration can be maintained and secured by a crimp. This type of isolator requires that the mounting blocks be forged from a malleable material. The wire rope cable is threaded through a series of lateral holes contained in the mounting blocks forming a helix. A force is then applied to at least one of the mounting blocks at a point where the wire rope is positioned so as to plastically deform the mounting block around the wire rope into locking contact. This design, however, is ill-suited for use with wire cables having large diameters. Wire ropes with large diameters require mounting blocks of substantial mass. Crimping a substantially thick mounting block around an equally dense wire cable would require a tremendous amount of force which in turn would result in an overall reduction of the integrity of the mounting block.

The other wire rope isolators described herein that use fasteners to secure the wire rope in place are also ill-suited in applications using wire ropes with significant diameters. As such, the production of large-scale isolators is limited. Accordingly, there continues to be a need for wire rope isolators constructed with wire ropes having relatively great diameters assembled without the use of any mechanical fasteners.

SUMMARY OF THE INVENTION

The present invention consists of a wire rope isolator that employs dowel pins to mechanically stake and/or engage the wire rope cable into locking contact with the mounting blocks. The dowel pins are forged of a material having a harder consistency than the material composing the mounting block and wire rope. The end of the dowel pin not engaging the wire rope is pressed flush to the outer surface of the mounting block. A simple wire rope isolator can be assembled by passing a wire cable through hollow cylindrical members, channels and the like contained in two or more mounting blocks so as to manipulate the wire rope into a geometric shape which imparts the wire rope with elastic, spring-like qualities. When the assembled isolator is connected to shock-sensitive machinery and/or equipment, the isolator insulates said machinery and/or equipment by deflecting potentially damaging vibrational energy away from the equipment when the mechanical system is subject to a dynamic load. In particular, the wire rope flexes and contracts causing the mounting blocks to move relative to each other to dissipate vibrational energy.

In a preferred embodiment, the ends of the dowel pins engaging the wire cable can be a wedge so as to facilitate the staking process. This goal is also achieved by including pilot holes in the mounting blocks that are perpendicular to the lateral holes in which the wire rope is situated. The dowel pin is driven directly into the wire rope avoiding the need to penetrate the surface of the mounting block. In accordance with a further aspect of this invention, the dowel pins used can be forged from hard steel while the mounting block and isolator are made from aluminum.

OBJECTIVES OF THE INVENTION

It is, therefore, an object of this present invention to improve energy absorption devices.

Another object of this invention is to improve wire rope vibration isolators for use in industrial applications.

It is a further object of the present invention to assemble a wire rope vibration isolator without the use of any mechanical fasteners.

Still another object of the present invention is to assemble a wire rope isolator that uses a wire cable having a diameter greater than the diameter of conventional wire cables currently available in industrial applications without compromising the integrity of the mounting block in which the cable is housed.

It is yet a further objective of the present invention to utilize all metal components in a wire rope vibration isolator so that the isolator may function under extreme operating conditions such as temperature and load.

Yet still another object of the present invention is to avoid a bonded chemical interface between the block member and the wire rope.

An additional object of the present invention to eliminate costly machining operations associated with securing retainer plates to the wire coils of a wire rope isolator.

Yet a further object of the present invention is to reduce the number of parts required to assemble a wire rope isolator for industrial applications.

Still yet another object of the present invention is to decrease the number of steps required for assembling a variety of sizes of wire rope isolators.

These and other objectives are attained in accordance with the present invention.

BRIEF DESCRIPTION OG THE DRAWINGS

Further objects of the present invention together with additional features contributing thereto and advantages accruing therefrom will be apparent from the following description of a preferred embodiment of the invention which is shown in the accompanying drawings with like reference numerals indicating like components throughout, wherein.

Figure 7:
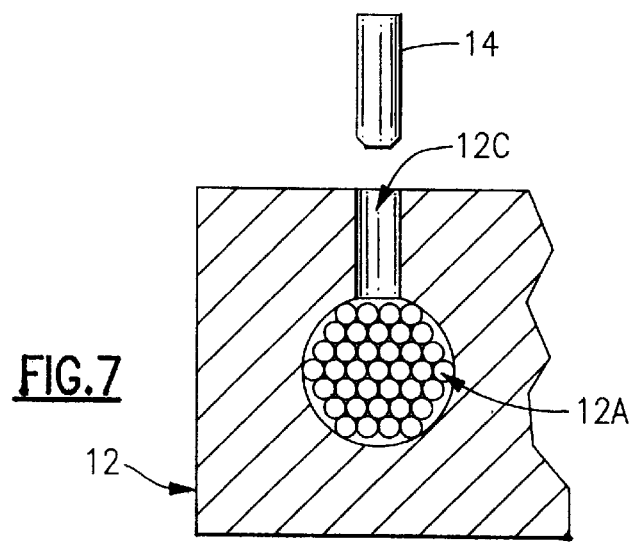

FIG. 7 is a cross-sectional view of a select portion of a mounting block of one embodiment of the present invention in which the mounting block is forged with pilot holes that are perpendicular to a lateral holes of the mounting block that contain a wire rope. FIG. 7 illustrates how the pilot hole facilitates the staking of the wire rope contained therein by allowing direct engagement of the wire rope by the dowel pin without first driving said dowel pin into the surface of the mounting block.

DETAILED DESCRIPTION OF THE INVENTION

Figure 1:
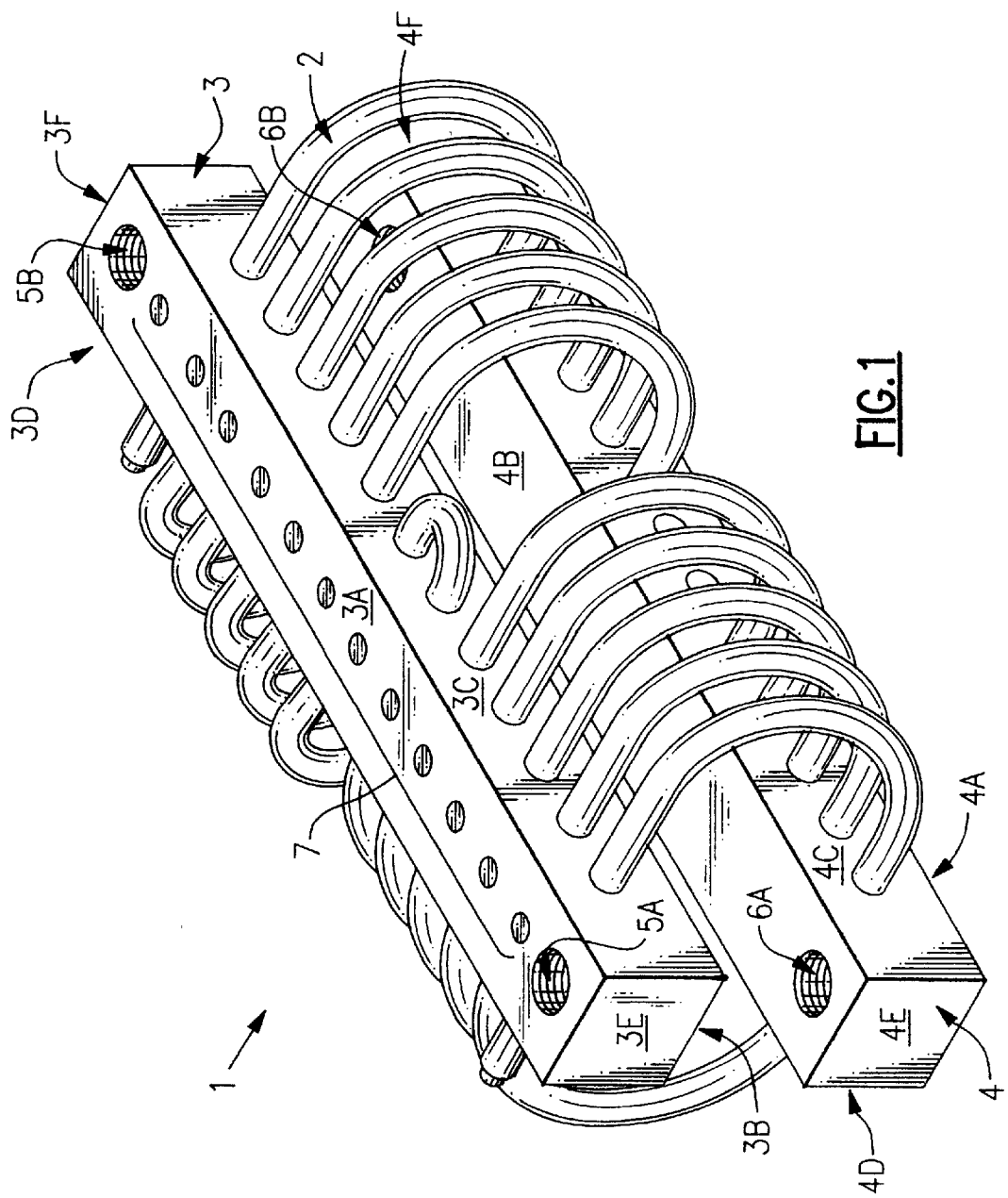
FIG. 1 is a perspective view of one embodiment of a wire rope vibration isolator according to the present invention.

Referring now to FIG. 1, there is shown a wire rope vibration isolator 1 in accordance with the present invention.

The isolator includes a substantially cylindrical coil of wire rope 2 which has a predetermined number of individual consecutive coils. The isolator 1 also includes a pair of mounting blocks 3 and 4. Each of the mounting blocks has opposing top 3A and 4A, bottom 3B and 4B surfaces, opposing side surfaces 3C, 3D, 4C, 4D and opposing end surfaces 3E, 3F, 4E and 4F. The mounting bars are not limited to a rectangular shape, but may also be round, half-round, formed with a crescent or oval top surface, or formed with any other suitable geometry. Each mounting block 3 and 4 has a series of lateral hollow cylindrical members, channels and the like passing axially therethrough. The wire rope is manipulated through one hole of one mounting block into the opposing empty hole of the opposing mounting block in a continuous loop until a plurality of bights are formed. This result can also be achieved using a plurality of wire ropes. The process is continued until the wire rope is shaped into a helix. The helical formation imparts an elastic quality to the wire rope causing it to flex and contract in a spring-like manner when subject to a dynamic load. This, in turn, allows the mounting block to move vertically relative to one another dissipating energy in the process.

Threaded fastener members 5A, 5B, 6A and 6B allow for either or both mounting blocks to be mounted on other objects.

Series of dowel pins 7 and 8 (not shown) are driven into each mounting block 3 and 4 at a location over each lateral hole so as to mechanically stake and/or engage the wire rope 2 into locking contact with each mounting block 3 and 4. The embodiment depicted in FIG. 1 illustrates a wire rope isolator 1 in which each lateral hole forged in each mounting block 3 and 4 has been staked by a series of dowel pins 7. In other embodiments, the staking of all lateral holes may not be required. As illustrated, the ends of the dowel pins not engaging the wire rope are pressed flush with the top surfaces 3A and 4A of the mounting blocks 3 and 4.

A It is required that the dowel pins used be constructed of a material that has a harder consistency than the mounting block and wire rope material. In one embodiment of the present invention, the mounting block and wire rope were forged from aluminum while the dowel pin was fashioned from hardened steel. This contrast eases the force necessary to drive the dowel pin through the mounting block and wire rope.

Figure 2:
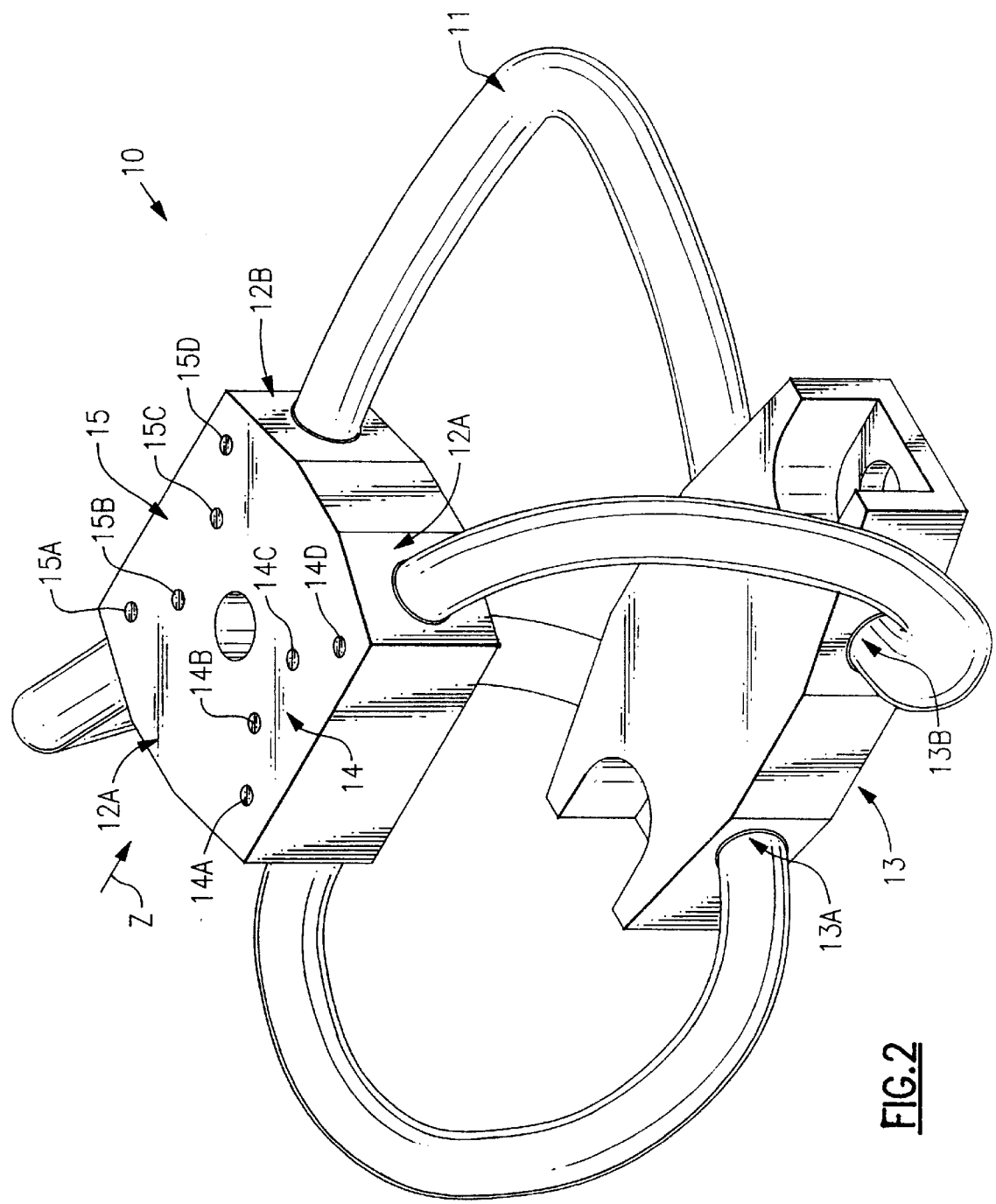
FIG. 2 is a perspective view of another embodiment of a wire rope vibration isolator according to the present invention.

FIG. 2 depicts a wire rope isolator 10 that does not manipulate the wire rope into a helix or coil. In this embodiment of the present invention, two mounting blocks 12 and 13 each with a pair of lateral holes 12A, 12B, 13A and 13B are spaced apart by a wire rope 11 that is passed through the lateral hole of one block into the empty lateral hole of the opposing block in an endless loop. As in the isolator depicted in FIG. 1, the wire rope is manipulated into a geometric shape that allows the mounting blocks to move relative to each other due to the elasticity of the wire rope.

A series of dowel pins 14 and 15 (the dowel pins for the lower mounting block 13 are not shown) are driven through each mounting block 12 and 13 into the wire rope 11 contained therein. In this particular embodiment, four dowel pins 14A, 14B, 14C, 14D, 15A, 15B, 15C and 15D are driven through the surface of the upper mounting block 12 into the lateral holes 12A and 12B containing the wire rope 11. The pins that are similarly driven into the lower plate 13 are not shown. More or less dowel pins may be used to secure the wire rope in other embodiments. Again, the dowel pins are pressed flush with the top surface of the mounting block and are composed of a material that is harder than the mounting block and wire rope material.

Figure 3:
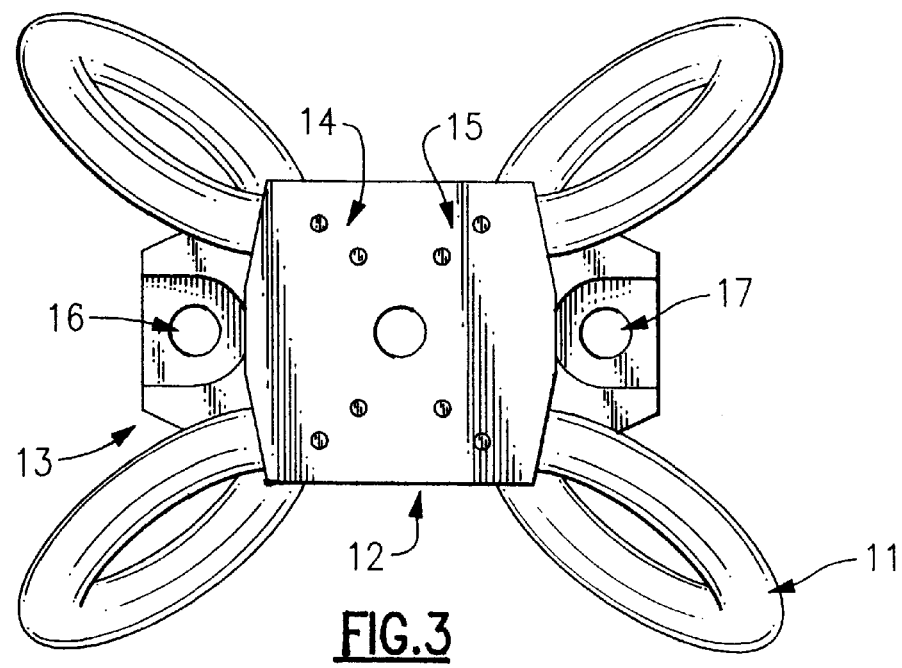
FIG. 3 is a top view of the wire rope vibration isolator illustrated in FIG. 2.

FIG. 3 is a top view of FIG. 2 looking down on the isolator. Series of dowel pins 14 and 15 are driven through the outer surface of the upper mounting block into the lateral holes 12A and 12B (not shown) forged in the upper mounting block into the wire rope 11 contained therein to secure the upper mounting block 12 into locking contact with the wire rope 11. Threaded mounting holes 16 and 17 are shown in the bottom mounting block 13 so that isolator 10 can be affixed to the sensitive equipment intended to be protected.

Figure 4:
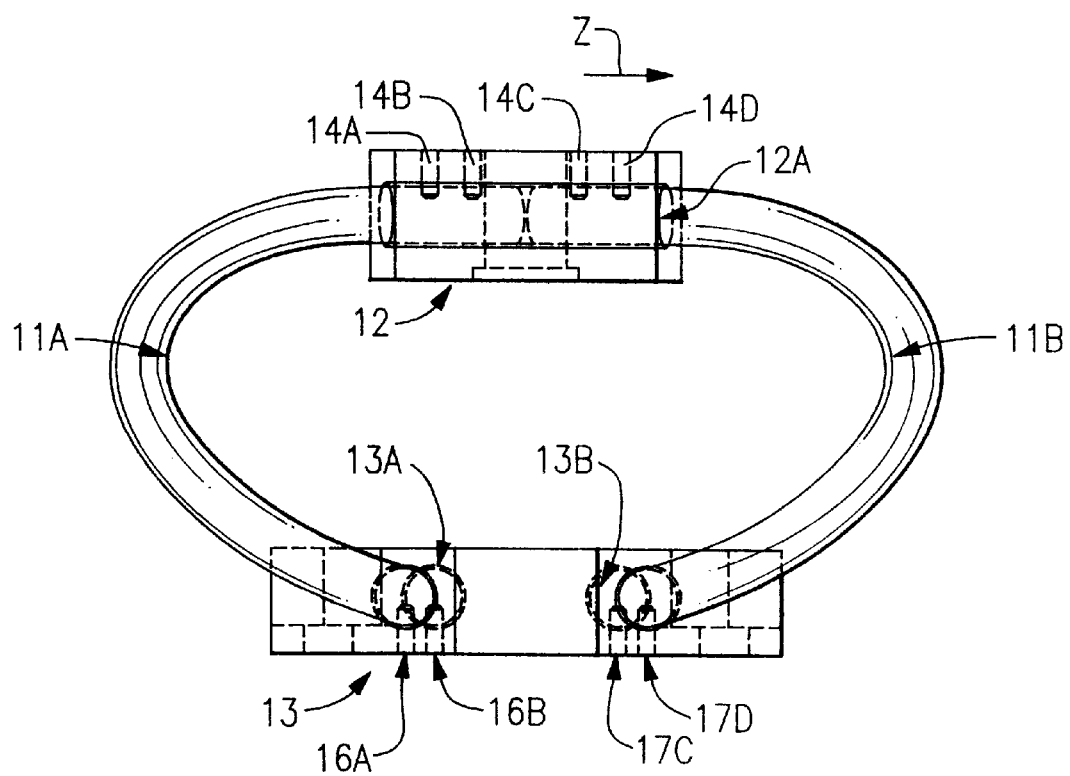
FIG. 4 is a cross-sectional view of a staked wire rope contained in the wire rope vibration isolator mounting block according to the present invention.

FIG. 4 is a cross sectional view along axis Z of the assembled isolator depicted FIG. 2. In this illustration, a wire rope 11 has been mechanically staked into locking contact with mounting blocks 12 and 13 by a plurality of dowel pins (14A, 14B, 14C and 14D secure the wire rope to the upper mounting block whereas dowels 16A, 16B, 17C and 17D secure the lower mounting block into locking contact). Wire rope 11 has been passed through the lateral holes 12A of the upper mounting block 12 and lateral holes 13A and 13B of the lower mounting block 13. The top mounting block 12 contains the terminal ends of wire rope 11 although several wire ropes can be utilized in other embodiments of the present invention. It is not required that the ends of the wire rope 11 abut as illustrated. In another embodiment of the present invention, a thin vertical web may be situated in any of the vertical holes in which the wire rope is passed to create a "blind hole" to assist in locating the position of the ends of the wire rope 11 during the assembly of the isolator. Dowel pins 14A, 14B, 14C and 14D have been driven through the outer surface of the upper mounting block 12 into sections of the wire rope 11A and 11B contained there so as to engage the wire rope 11 into locking contact with upper mounting block 12. It should be noted that the dowel pins need not be driven into the mounting block from the top surface of the mounting block. The dowel pins could have been driven into the mounting block from the bottom or either opposing side surfaces as well, so long as the dowel pin is positioned over the lateral hole so that when a sufficient force is applied it is driven through the mounting block and into the wire rope contained therein. In the preferred embodiment, the dowel pins are pressed flush with the mounting plate surface during assembly.

The wire rope 11 arcs outward from the mounting blocks creating bights having elastic qualities. During use, these bights flex and contract when subject to a dynamic load. In turn, the mounting blocks 12 and 13 move toward each dissipating energy in the process.

The opposing ends of the wire are also secured by dowel pins 16A, 16B, 17C and 17D to the lower mounting block 13 in much the same manner. In this perspective, the wire rope is passed completely therethrough the lateral holes 13A and 13B contained in the lower mounting block 13.

Figure 5:
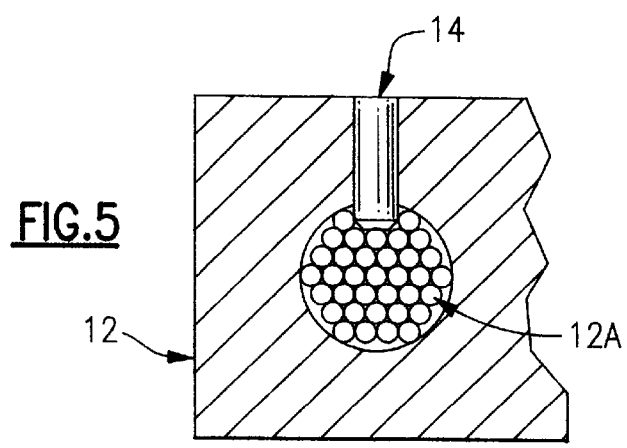
FIG. 5 is a cross-sectional view of portion of a mounting block of one embodiment of the present invention after the wire rope has been passed through the lateral hole forged into the mounting block and a dowel pin has been driven into locking contact with said wire rope.

FIG. 5 is a cross-sectional view of a mounting block 12 containing a lateral hole 12A passing from one surface of the upper mounting block to the opposing surface of the upper mounting block. A wire rope 11 is passed through the lateral hole 12A of the mounting block 12. A dowel pin 14 has been driven through the outer surface of the mounting block 12 into the wire rope 11 contained in the lateral hole below the surface so as to said wire rope 11 into locking contact with the upper mounting block 12. As illustrated, in the preferred embodiment, the dowel pin 14 is pressed flush with the outer surface of the mounting block 12.

Figure 6:
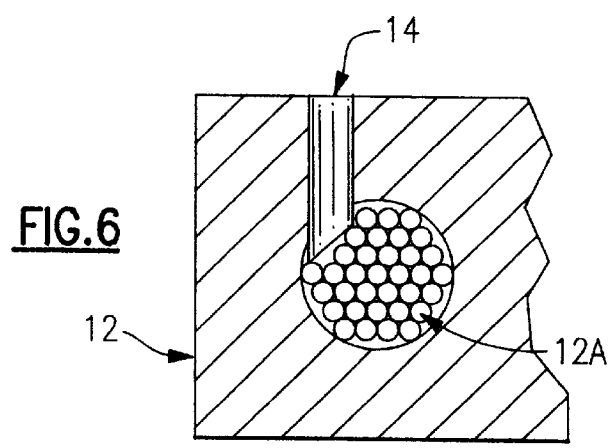
FIG. 6 is a cross-sectional view of a select portion of a mounting block of one embodiment of the present invention in which head of the dowel pin is a wedge which is driven off-center into locking contact with the wire rope contained in a lateral hole of a mounting block.

FIG. 6 is a cross-sectional view of a mounting block 12 containing a lateral hole 12A passing from one surface of the upper mounting block to the opposing surface of the upper mounting block. A wire rope 11 is passed completely therethrough the lateral hole 12A of the mounting block 12. A dowel pin 14 having a tip shaped into a wedge has been driven through the outer surface of the mounting block 12 into the wire rope contained in the lateral hole situated below the outer surface so as to stake the wire rope 11 contained in the lateral hole 14 therein into locking contact with the mounting block 12. In this embodiment, the dowel pin 14 stakes the wire rope 11 off-center so as to increase the area of contact between the dowel pin 14 and the wire rope 11. As illustrated, in the preferred embodiment, the dowel pin 14 is pressed flush with the outer surface of the mounting block 12.

FIG. 7 is a cross-sectional view of a mounting block 12 containing a lateral hole 12A passing from one surface of the upper mounting block to the opposing surface of the mounting block 12. A wire rope 11 is passed completely therethrough the lateral hole 12A of the mounting block 12. In this embodiment of the present invention, a pilot hole 12C has been formed in the mounting block 12 perpendicularly to the lateral hole 12A in which the wire rope 11 is contained. The pilot hole 12C allows for the direct engagement of the dowel pin 14 with the wire rope 11. In contrast to the other embodiments described herein, the dowel pin 14 need not be driven into the mounting block before staking the wire rope 11.

While this invention has been described in detail with reference to a certain preferred embodiment and a preferred method for making the illustrated embodiment, it should be appreciated that the present invention is not limited to those precise embodiments. Rather, in view of the present disclosure which describes the best mode for practicing the invention, many modifications and variations would present themselves to those of skill in the art without departing from the scope and spirit of this invention, as defined in the following claims.

What is claimed is:

1. A pair of spaced apart mounting blocks each having a plurality of laterally extended holes passing through opposed side walls of said blocks, said blocks being fabricated of a first material,
   a wire rope passing through said lateral holes along an endless path of travel, and
   a plurality of pins formed of a second material housing a hardness that is greater than said first material that are drawn into said block perpendicular to said holes so that said pins penetrate into said holes a sufficient distance so that said pins mechanically lock the wire rope to said blocks.

2. The wire rope isolator of claim 1 wherein said pins are equipped with a wedge shaped front tip for facilitating penetration of said blocks.

3. The wire rope isolator of claim 2 wherein each block further includes a series of pilot holes passing into the block perpendicular to each lateral hole for guiding the pins into the lateral holes.

4. The wire rope isolator of claim 2 wherein the axis of the pin is offset from the center of the lateral hole so that the area of locking contact between the pin and the wire rope is maximized.

5. The wire rope isolator of claim 2 wherein said first material is aluminum and said second material is hardened steel.

* * * * *